US011219167B2

(12) United States Patent
Samadpour

(10) Patent No.: US 11,219,167 B2
(45) Date of Patent: *Jan. 11, 2022

(54) METHOD AND APPARATUS FOR GROWING SPROUTS

(71) Applicant: Institute for Environmental Health, Inc., Lake Forest Park, WA (US)

(72) Inventor: Mansour Samadpour, Lake Forest Park, WA (US)

(73) Assignee: Institute for Environmental Health, Inc., Lake Forest Park, WA (US)

( * ) Notice: Subject to any disclaimer, the term of this patent is extended or adjusted under 35 U.S.C. 154(b) by 193 days.

This patent is subject to a terminal disclaimer.

(21) Appl. No.: 16/513,949

(22) Filed: Jul. 17, 2019

(65) Prior Publication Data
US 2020/0100434 A1 Apr. 2, 2020

Related U.S. Application Data

(63) Continuation of application No. 14/352,304, filed as application No. PCT/US2012/060881 on Oct. 18, 2012, now Pat. No. 10,356,984.
(Continued)

(51) Int. Cl.
*A01G 9/02* (2018.01)
*A01G 1/02* (2006.01)
(Continued)

(52) U.S. Cl.
CPC . *A01G 9/02* (2013.01); *A01C 1/02* (2013.01)

(58) Field of Classification Search
USPC ....... 47/61, 60, 65.5, 65, 15, 63, 59 R–62 R, 47/62 N, 58.1 SE, 84, 66.7, 69, 80,
(Continued)

(56) References Cited

U.S. PATENT DOCUMENTS 2,431,063 A 11/1947 McGahey
2,957,274 A 10/1960 Colvin
(Continued)

FOREIGN PATENT DOCUMENTS

DE 29 06 959 A1 8/1979
FR 2694480 A1 2/1994
(Continued)

OTHER PUBLICATIONS

Courter, G., "Growing Sprouts at Home," Mother Earth News, Excerpt from "The Beansprout Book," Jan./Feb. 1977, <http://www.motherearthnews.com/organic-gardineing/growing-sprouts-at-home-zmaz77zbon?pageid=3#PageContent3> [retrieved Dec. 12, 2016, 4 pages.

(Continued)

*Primary Examiner* — Andrea M Valenti
(74) *Attorney, Agent, or Firm* — Barry L. Davison; Davis Wright Tremaine LLP

(57) ABSTRACT

Provided are methods for growing and shipping sprouts and microgreens in the same container, growing while in shipment using moisture provided in a water-absorbent layer, with optional added beneficials, and including methods for producing sprouts and microgreens for consumption, and for pharmaceutical/nutriceutical use, comprising growth of sprouts in retail-ready containers, the container comprising a moisture-retaining layer of agar media or the like providing water for growth and obviating the need for irrigation during sprout growth. In certain aspects, media is supplemented with beneficial organisms or additives such as probiotic microbes, vitamins (e.g., B12), cofactors, nutrients, and other items (e.g., phytochemicals, natural colors, and antioxidants) which promote the growth of the beneficial microbes on the product, and/or which become incorporated into the product. In certain aspects, added beneficial micro- (Continued)

organisms are selected to compete/antagonize human pathogens such as *Listeria, Salmonella*, enterohaemorrhagic *E. coli, Yersinia*, and/or spoilage organisms (e.g., *Erwinia, Pseudomonas* and *Xanthomonas*).

24 Claims, 2 Drawing Sheets

Related U.S. Application Data

(60) Provisional application No. 61/654,571, filed on Jun. 1, 2012, provisional application No. 61/548,714, filed on Oct. 18, 2011.

(51) Int. Cl.
  *A01G 22/00* (2018.01)
  *A01C 1/02* (2006.01)
(58) Field of Classification Search
  USPC .................................................... 47/DIG. 9
  See application file for complete search history.

(56) References Cited

U.S. PATENT DOCUMENTS

| | | | |
|---|---|---|---|
| 3,710,510 A | | 1/1973 | Tully |
| 3,906,663 A | * | 9/1975 | Peng .................... A01G 31/02 47/14 |
| 4,027,427 A | | 6/1977 | Stoller et al. |
| 4,114,315 A | | 9/1978 | Rinella |
| 4,124,953 A | | 11/1978 | Patton |
| 4,189,868 A | | 2/1980 | Tymchuck |
| 4,249,341 A | | 2/1981 | Hugeli |
| 4,291,493 A | | 9/1981 | Monson |
| 4,292,761 A | | 10/1981 | Krave |
| 4,299,054 A | | 11/1981 | Ware |
| 4,330,957 A | | 5/1982 | Davis |
| 4,653,225 A | | 3/1987 | Spector |
| 4,790,105 A | | 12/1988 | Wareing |
| 5,628,144 A | | 5/1997 | Eastin |
| 6,581,327 B2 | | 6/2003 | Adelberg |
| 6,681,521 B1 | | 1/2004 | Holloway |
| 7,972,840 B2 | | 7/2011 | Hasegawa |
| 2003/0024163 A1 | * | 2/2003 | Sasuga ................... A01G 13/04 47/84 |
| 2009/0077873 A1 | | 3/2009 | Petersen |
| 2014/0101997 A1 | | 4/2014 | Voermans et al. |

FOREIGN PATENT DOCUMENTS

| | | |
|---|---|---|
| JP | 57-059541 | 4/1982 |
| JP | 59-179553 | 11/1984 |
| JP | 61-175949 | 11/1986 |
| JP | 2001-028957 A | 2/2001 |
| JP | 2003-034607 A | 2/2003 |
| JP | 2004-242576 A | 9/2004 |
| JP | 2005-333841 A | 12/2005 |
| JP | 2007-228926 A | 9/2007 |
| JP | 2008-237116 A | 10/2008 |
| NL | 8 500 603 A | 10/1986 |
| NL | 9 200 765 A | 11/1993 |
| WO | 1994/016053 A1 | 7/1994 |
| WO | 2008/116954 A1 | 10/2008 |

OTHER PUBLICATIONS

"Seed Scarification, Seed Stratification & Seed Soaking: How to Stratify Seeds," p. 2 of 7, May 18, 2011 <http://mrbrownthumb.blogspot.com/2011/05/seed-scrafication-seed-stratification.thml> [retrieved Dec. 12, 2016], 7 pages.

International Search Report dated Mar. 27, 2013, in International Patent Application No. PCT/US2012/060881, filed Oct. 18, 2012, 3 pages.

European Search Report dated May 20, 2015, in European Patent Application No. 12841840.7, filed Oct. 18, 2012, 7 pages.

Japanese Office Action dated Jul. 21, 2016, issued in Japanese Patent Application No. 2014-537257, filed Oct. 18, 2012, 11 pages.

Japanese Final Office Action dated Jul. 3, 2017, issued in Japanese Patent Application No. 2014-537257, filed Oct. 18, 2012, 6 pages.

\* cited by examiner

METHOD AND APPARATUS FOR GROWING SPROUTS

CROSS-REFERENCE TO RELATED APPLICATIONS

This application is a continuation of U.S. patent application Ser. No. 14/352,304, filed Apr. 16, 2014, which is a U.S. National Phase, under 35 U.S.C. § 371, of International Patent Application No. PCT/US2012/060881, filed Oct. 18, 2012, which claims the benefit of priority to U.S. Provisional Patent Application No. 61/548,714, filed Oct. 18, 2011, and U.S. Provisional Patent Application No. 61/654,571, filed Jun. 1, 2012, the disclosures of which are incorporated by reference herein in their entirety.

FIELD OF THE INVENTION

Particular aspects of the invention generally relate to sanitary methods for producing sprouts and microgreens for consumption (e.g., human, pet, and animal consumption), and in particular aspects, for pharmaceutical and nutriceutical use, the methods providing for growth of sprouts in a container (e.g., retail ready/use ready container), and preferably without the need for further irrigation during growth.

BACKGROUND OF THE INVENTION

Sprouts, microgreens, shoots or crests (herein referred to as sprouts) are a food produced by exposing seeds to conditions which cause them to germinate and grow into tiny plants. This has previously been done by exposing seeds to moisture by various methods such as immersion or spray. Seeds which are germinated into edible small plant forms include, but are not limited to, those from alfalfa, clover, mung bean, radish, mustard, broccoli, flax, green peas, sunflower, corn, wheat, soybeans, and others.

Seeds that are used for sprouting purposes are obtained from sources such as farm fields, and stored in places such as agricultural warehouses that may be contaminated with bacteria, fungi, or other organisms that can be harmful to health. For example, farm fields may become impacted with wildlife that carry microbial pathogens such as *E. coli* O157:H7, and *salmonella*, which can get spread to crops and ultimately to the seeds. Seeds harvested from such fields, and sprouts germinated from such seeds, may be contaminated (e.g., contaminated by such microbial pathogens).

Other organisms (e.g., spoilage organisms) with which sprouting seeds may be contaminated may interfere with the quality of sprouts by, for example, imparting to them a bad flavor or color, or by reducing shelf life.

Organisms harmful to the healthfulness and quality of sprouts may also come to be present with the seeds from sources other than seed harvest and transport. For example, water for soaking and spraying seeds and sprouts during washing and germination may be contaminated, as may be the processing machinery surfaces and even process air used for aeration of sprouting chambers. Furthermore, workers working in a sprout manufacturing plant can carry pathogens and transfer them to products directly through handling of the products, and/or indirectly by contaminating the production environment.

In the prior art, sprouts and microgreens are grown by methods which include soaking, sanitizing the seeds, placing the seeds in trays, drums or bags to allow for the growth to marketable size. Alternatively, seeds may be placed in retail containers, with irrigation holes in the bottom, over a foam or an absorbent material such as cellulose and sprouted in the same container in which they may ultimately be delivered to consumers, placing the containers on trays and irrigating the growing sprouts from overhead or from the bottom tray with the seeds being irrigated periodically via holes in the container. At the end of the growth cycle, the prior art containers are capped with a lid, labeled and sent to the market with open irrigation holes, which compromises the sanitary condition of the product and its package. Both of the foregoing prior art methods typically involve irrigation of the sprouts during all stages of their growth. For example, in one rotary drum method, sanitized seeds are grown for 4-6 days with constant rotation and irrigation of the drums, followed by washing of the sprouts and manual or automated packaging. At the end of the growth cycle, sprouts leaving the drums typicalloyi contain about 10,000,000 to 100,000,000 cfu (colony forming units) of bacteria per gram. A subsequent wash and sanitation may reduce this load of bacteria by only a factor of 10 or 100, but this reduction is rapidly undone by continued/more bacterial growth during subsequent storage.

With respect to prior art methods wherein the sprouts are grown in trays or containers (e.g., in the ultimate retail container), the trays and containers are typically placed on racks and are typically irrigated for the length of the growth cycle by means of overhead irrigation, or by means of entry points in the bottom of the trays or containers, through which the irrigation water may enter. The sprouts and microgreens, therefore, are exposed to contaminants that may enter with the irrigation water or with air that enters via the same pathway as the irrigation water, or via drainage holes that are provided for the irrigation water. Such holes for the entry and exit of irrigation water allow microbial contamination to be introduced throughout the growth cycle.

There is a pronounced need in the art for methods/means for protecting the healthfulness and quality of sprouts from pathogenic and spoilage organisms, by containing the growth for most of the growth cycle in a sanitary, closed, retail-ready container.

SUMMARY OF THE INVENTION

Aspects of the present invention provide methods for growing sprouts and microgreens that reduces the chance for growth of harmful microorganisms in the sprouts. In certain aspects, the methods allow for growing the sprouts for most of their growth cycle in a retail/consumer ready package, for the first time allowing for growth to happen when the products are packaged, boxed and palletized, even during transportation. In certain aspects, the methods allow for full automation of sprout processing facilities, and/or allow for long-distance shipping of sprouts, while they are growing. The methods also have the advantage of providing for increased shelf-life due to the sanitary condition of the growing environment and lack of post-process contamination.

In certain aspects, the present invention provides means for protecting the healthfulness and quality of sprouts from pathogenic and spoilage organisms, by containing the growth for most of the growth cycle in a sanitary, closed, retail-ready container, thereby eliminating the need to irrigate the growing seeds and sprouts. In certain aspects, the containers used in the inventive method are closed to the outside environment with the exception of allowing for exchange of air and gases. Additionally, in certain aspects, the inventive method facilitates the addition of a protective or beneficial microbiological flora that will compete with and resist any harmful organisms (e.g., pathogen or spoilage organisms) that might otherwise be in, or be introduced into the sprouts, with such beneficial microflora effectively acting as a protective immune system for the growing sprouts and microgreens. In certain embodiments, addition of beneficial microorganisms to the sprouts may be by direct application to the seeds and sprouts, and/or by adding such microorganisms to, for example, agar and/or other growth media in the container. In yet additional aspects, applied or added beneficial microbes may be selected which assist in nitrogen fixation and/or promote plant growth. In yet further aspects, addition of beneficial probiotic organisms, vitamins, nutrients, cofactors, and the like (e.g., in each case to benefit the human and animal consumers of the sprouts) is also provided and facilitated, because the inventive methods avoid the use of irrigation water on the sprouts, which irrigation water necessarily acts to wash such beneficial organisms and additives away.

According to particular aspects, seeds or growing sprouts are sanitized so as to reduce or eliminate any pathogens. Bad flora to be replaced include, but are not limited to, *salmonella, Listeria,* enterohemorrhagic *Escherichia coli* (EHEC), and spoilage organisms such as *Psuedomonas*. Then the seeds or sprouts are placed into a sanitized container with at least one composition selected from the group consisting of pasteurized/sterilized agar, agar-agar, seaweed, algae, algal extracts, plant derived polyesters such as cellulose, chitin, pectin, water absorbing natural fibers, foams, sponges and water absorbing polymers, or other water-absorbent compositions that can retain water and make such water available to the sprouts. Since the sprouts are thus provided with a supply of water in the container which is sufficient to complete their growth to marketable bulk, there is no need for additional water to be introduced to the container by way of irrigation-thereby eliminating one pathway for contamination, and also permitting the sprouts to grow in containers while en route from the processing facility to the ultimate consumer. In certain aspects, the media may also be provided with beneficial microorganisms which can, for example, produce natural antimicrobial substances that will assist in suppressing contaminant organisms. Additionally, or alternatively, the media may also be provided with other microorganisms that produce vitamins (e.g., B12), that add nutritional value to the sprout product. In certain aspects, added beneficial organisms may also compete with and thus control the growth of harmful organisms. The seed or sprouts in the container with the media layer may be promptly shipped from the packaging facility, and then allowed to grow while in transit and while on store shelves while waiting to be purchased. Vehicles used for shipping are preferably provided with temperature control to maintain proper temperatures for sprout growth and/or, later, storage. The sprout containers, not requiring additional input of water, may be sealed, except, preferably, for means such as a permeable plastic or cellulose layer, that permits gas exchange, while at the same time blocking entry of microorganisms and other contaminants.

In particular aspects, the present invention relates to a sanitary method for producing sprouts and microgreens for human, pet, and animal consumption, and for pharmaceutical and nutriceutical use. Preferred embodiments of the invention provide for growth of sprouts in a sanitary retail-ready or use-ready container without further need for irrigation. In one embodiment, the container comprises a bottom moisture-retaining layer of agar or the like which provides water for growth, thus obviating the need for irrigation of the sprouts during the growth process. In certain aspects, the media can be supplemented with beneficial additives such as probiotic microbes, vitamins, cofactors, nutrients, and other items which promote the growth of the beneficial microbes on the product or which become incorporated into the product. Preferably, beneficial additives may include vitamin B12, phytochemicals, natural colors, and antioxidants. Preferably, additive beneficial microorganisms will be selected to provide antagonistic effects on human pathogens such as *Listeria, Salmonella,* enterohaemorrhagic *E. coli, Yersinia,* and/or spoilage organisms (e.g., *Erwinia, Pseudomonas* and *Xanthomonas*).

A particular embodiment of the invention comprises the steps of: a) placing a sanitized, non-toxic, preferably edible, water-absorbent medium, which contains enough water for sprouts to grow to their full intended size, into containers, which may be a retail-ready or use-ready container, with the water content of said medium being adequate to support growth of the sprouts without the need for irrigation; b) placing seeds or sprouts upon the medium; c) optionally providing beneficial or probiotic organisms or nutritional factors; d) providing temperature conditions to the containers suitable for promoting growth of sprouts in the container; e) optionally placing the containers into transit in a temperature controlled shipping container or the like while the growth of step d) is taking place; and f) optionally, once sprout growth has completed to an adequate extent, shifting the temperature of the containers to a lower temperature suitable for storage and extended shelf life. The temperature provided in growth step d) may preferably be in the range of 15-27° C. (60-80° F.), and the temperature provided in storage step f) may preferably be in the range of about 0-7° C. (32 to 45° F.).

DETAILED DESCRIPTION OF EXEMPLARY ASPECTS OF THE INVENTION

According to particular exemplary aspects, sprouts are grown upon a layer of media in a container such as a plastic "clam shell" or other form of plastic or polymer based packages. Other usable containers are, for example, glass jars, ceramic jars, plastic tubs with lids, and growing trays with lids. The media may be or comprise any one of a number of types, which have the common characteristic of being water-absorbent and structurally supportive of seeds or sprouts which may be placed in proximity. Agar and other types of gel are suitable, but the invention may be practiced with other water-absorbent materials such as cellulose fibers (e.g., at least one composition selected from the group consisting of pasteurized/sterilized agar, agar-agar, seaweed, algae, algal extracts, plant derived polyesters such as cellulose, chitin, pectin, water absorbing natural fibers, foams, sponges and water absorbing polymers, or other water-absorbent compositions that can retain water and make such water available to the sprouts).

Figure 1:
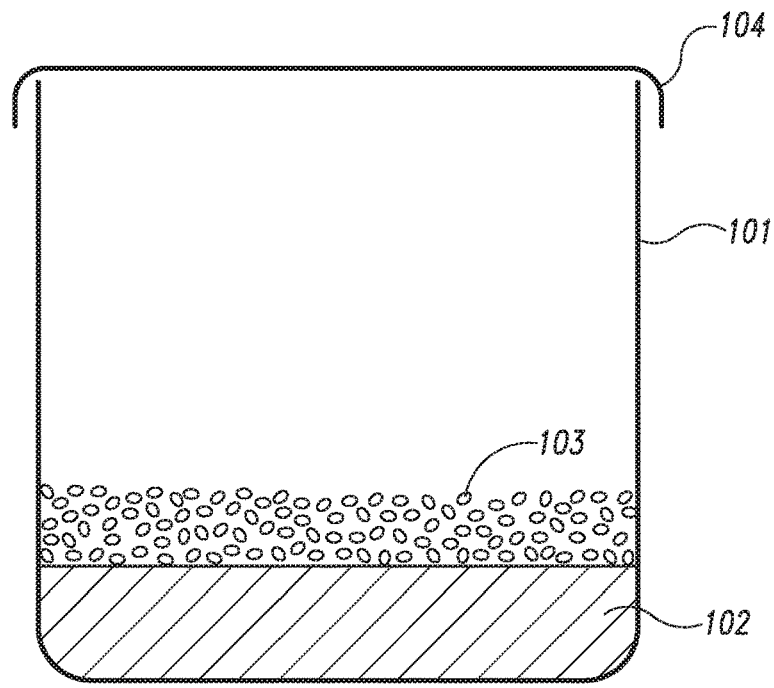
FIG. 1 is a diagram of an exemplary container used in sprout production according to certain aspects of the present invention.

Referring to FIG. 1, and embodiment of the inventive method for growing sprouts is as follows: container 101 which will hold the sprouts is preferably first sanitized by application of a hydrogen peroxide, alcohol, ultraviolet light, steam, or other appropriate sanitizing agent.

Then layer 102, a sterile/pasteurized media containing appropriate amounts of water to complete the growth cycle, is placed into container 101. If the chosen media is agar, this placement may be accomplished by pouring heated, liquid agar solution into the container and allowing it to cool. Layer 102 may be optionally inoculated with beneficial microorganisms as disclosed herein, and additionally there may be added nutrients to promote the growth of beneficial organisms. Other additives to layer 102 may include antioxidants, vitamins, natural pigments, organic materials such as algae and seaweed, and plant nutrients, to promote the growth of the germination and growth of seeds and sprouts.

Seeds or sprouts are put into contact with water and allowed to absorb water, and also sanitized. This step is important when a high density of seeds is applied to the top of the gel layer, for two reasons: First, if sufficient seeds are applied so that more than one layer of seeds comes to be present, then seeds in the upper layer will not be in direct contact with the gel, and will have no immediate source of water to promote germination. In this case, pre-soaked seeds which have absorbed water may rely upon internal moisture to support germination and growth of an initial root down into the water-containing gel. Second, if a high density of seeds is placed upon the gel layer, then the gel proximate to these seeds tends to become depleted of water as moisture is absorbed into the many proximate seeds. The depleted gel is unable to supply sufficient water to allow adequate germination of the seeds. This is problem is referred to herein as "gel top layer dry out."

Preferably, the seeds are allowed to absorb at least about 40% of their dry weight in water during the soaking process, and even more preferably, 80% or more of their dry weight.

Sanitized seeds or sprouts 103 are placed in contact with layer 102 so that they may grow with the benefit of the water contained in layer 102. Container 101 is preferably closed against microbial contamination, by, for example, placing a lid 104 on top of the container. Preferably, lid 104 may comprise a portion or patch of plastic or other membrane material that allows for exchange of gases, such as waste gases from plant respiration. More preferably, the lid materials may further permit passage of water vapor, so that excess condensation in the container may be avoided. Optionally, a gas-exchange membrane may be provided at some other place on the container (other than the lid), or provision for gas exchange may be provided by means other than a membrane, such as by permitting the lid to be slightly ajar, yet still placed so as to prevent entry of microbes, in the same manner of operation as a common petri dish lid. The point is that means be provided for the exchange of gasses and water vapor which do not afford an entry point for microorganisms. A key concept of this invention is maintaining layer 102 and seeds 103 in a state of isolation from outside air and water, except such as might pass through a membrane or other means for excluding contaminant microorganisms that may exist outside of container 101.

A preferred embodiment for practicing this invention is as follows, and referring to FIG. 2. Seeds, for example alfalfa seeds, are obtained 200 from a distributor. These seeds are sanitized 201, with or without pre-soaking, by soaking them in a solution comprising, for example, at least one agent selected from the group consisting of bleach, hydrogen peroxide, organic acids, and/or other appropriate sanitizers with or without non-foaming surfactants. Alternatively, the seeds can, for example, be flash-pasteurized by brief exposure to hot water. The seeds are then rinsed with water that may contain appropriate residual sanitizer levels. Although the seeds may be immediately placed upon the layer of media and sealed into a container, it is best to soak the seeds so that they absorb water. Preferably, the seeds are allowed to absorb at least about 40% of their dry weight in water during the soaking process, and even more preferably, 80% or more of their dry weight. Seeds that have absorbed water tend to sprout and root better into the medium. Thus the seeds are soaked and drained 202. The moistened seeds may also, optionally, be stockpiled in a refrigerator for a period of time for later use.

After the optional refrigeration period, if any, the seeds are once again sanitized for an appropriate time and with appropriate concentration of the sanitizing agents to reduce the bio-burden of microbes attached to the seeds without impacting germination. Optionally, the seeds can then be pre-germinated by putting them into a germination chamber to germinate for 1-2 days, or can be directly placed into contact with an agar layer 203 in the same container in which they will be shipped. In the event that the seeds are pre-germinated, they can be subjected to a third wash and sanitation protocol after which they can be placed into containers in step 203. The seeds germinate and proceed to grow 204 in the container. This growth may occur while the container is in a holding area of a manufacturing facility and/or while it is in transit 205 to the consumer and/or while the product is awaiting purchase by consumers on store shelves.

The layer of media on the bottom of the container may be of any suitable thickness, with the intent of the invention being best served by a layer which provides just enough volume of water to sustain sprout growth sufficient such that the sprouts come to fill the container. An optimum amount of agar would be such that the agar layer comes to be more or less completely absorbed after several days of sprout growth, and the container appears to contain only sprouts.

It is important to emphasize that any gel media upon which the seeds are placed must be suitable for human consumption (i.e., edible and preferably palatable), since particles of the gel may be present with the product. Preferably, this means that no non-edible germicide or other chemical may be added to the media.

The food products produced by the methods of this invention may be additionally enhanced by various means. As described above in relation to FIG. 2, the seeds are preferably first sanitized 201 by washing in a sanitizing solution such as bleach, for example, in a concentration of no more than 20,000 ppm calcium or sodium hypochlorite. This soaking may be for a period of time from, for example, 5 to 15 minutes or so, such that any bacteria are reduced in number but the seeds remain fertile. The subsequent sanitation of the hydrated seeds is done in much lower dilutions of sanitizing agents to ensure that they are reducing the microbial load without impacting germination. Thus, subsequent washing can be done, for example, in 50-2000 ppm of calcium or sodium hypochlorite. In certain aspects, it has been found that the seeds must be hydrated before being placed atop agar or other gel media if adequate germination rate and root penetration into the agar is to be obtained with the high densities of seeds required for adequate sprout production.

After the primary sanitizing treatment, and a wash to remove the residue, the seeds may be preferably drained and refrigerated, and cultures of beneficial microorganisms may be added. These might include yeasts or other microbes, which will provide vitamin B12, and commensual microbes that are antagonistic to human pathogens, plant pathogens, and spoilage organisms. The beneficial microorganisms added may consist of one organism or comprise a cocktail of microbes blended for multiple tasks, such as production of anti-microbial metabolites; production of vitamins, cofactors, enzymes; and competition for nutrients with pathogens and/or spoilage organisms. The added beneficial microbial flora provides a replacement flora, given that the natural flora of the seeds is destroyed through aggressive sanitation, and is then replaced by beneficial organism(s) (e.g., an appropriate mix of mesophilic and psychrotrophic/psychrophilic beneficial organisms). The beneficial organisms may, for example, be spray inoculated onto the seed, such that they will tend to form bonds to the seeds and will adhere to them when the seeds are placed on the agar in step 203. In addition to adding beneficials at this stage (e.g., to the sterilized seed), the agar itself may be inoculated when it is prepared or after it is placed into the container.

"Beneficial" organisms include and in certain aspects are defined as harmless, edible microorganisms that can produce vitamins, enzymes, or cofactors that are healthful for humans, or which increase the nutritional value of sprouts and microgreens. Beneficial organisms in certain aspects may also inhibit pathogen and spoilage-organism growth by means of competition for space and nutrients and sometimes also by the production of growth-inhibitory metabolites. Such beneficial organisms may be selected to grow competitively at mesophilic growth temperature range, which also tends to be the best range for sprout germination and growth. Alternatively, such organisms may be selected to grow in the colder, psychrophilic range, thus affording best growth during later shipping 205 and storage phases after sprout growth has been accomplished and colder temperatures are employed to enhance storage and shelf life.

"Beneficial microbes" or "beneficials" comprise living organisms such as bacteria, phages, yeast, viruses, fungi and the like which have the effect of inhibiting growth of pathogenic or otherwise harmful organisms. The term beneficials used in this description also includes natural antibiotic substances created and secreted by probiotic organisms, which substances tend to inhibit the growth of harmful organisms, for example, benign bacteriocins; and it also includes benign phages and viruses that attack pathogenic cells.

It is to be understood that the term beneficial microbes or beneficials herein may also refer to mixtures of various probiotic species and various substances in addition to a single species or single substance. "Beneficials" used herein may also have the ability to deliver antagonistic properties against undesirable pathogens that might otherwise come to be present in liquids used for sprout germination and growth.

One preferred group of microorganisms according to the present invention comprises lactic acid-producing microorganisms which inhibit pathogens by competing for substrate and generating a non-conducive acidic environment. The antagonistic properties of the lactic-acid producing microorganisms may additionally arise from other metabolites, like enzymes (e.g., lactoperoxidases), pathogen-specific toxins, carbon dioxide, peroxides or antibiotics, such as bacteriocins.

Beneficials may also include spore-forming organisms such as *B. coagulans, Bacillus clausii, Bacillus pumilus*, and other non-toxigenic, non-pathogenic *Bacillus* strains. These may have antimicrobial effects against target organisms and have potential beneficial effects in humans, for instance, as immunostimulants. These microorganisms have the ability to create very quickly an environment that is not suitable for the growth of pathogens. This is due to the rapid growth, high yield and reproducibility of such microorganisms in comparison to other lactic acid producing bacteria like *Lactobacillus acidophilus*. Spore-forming microorganisms are able to survive longer and reproduce themselves in comparison to non spore-forming microorganisms.

Exemplary suitable beneficial agents/organisms for use herein are lactic acid-producing microorganisms. Exemplary suitable lactic acid producing microorganisms for use herein are microorganisms that exhibit antagonistic properties against undesirable strains of microorganisms by releasing amongst other metabolites, lactic acid.

Exemplary suitable lactic acid producing bacteria for use herein include at least one selected from the genera group consisting of *Lactobacillus* (homofermentative members of the group), *Lactococcus, Pediococcus* and/or *Leuconostoc*, and preferably the species *Lactobacillus acidophilus, Lactobacillus curvatus, Lactobacillus plantarum, Lactobacillus jenseni, Lactobacillus casei, Lactobacillus fermentum, Lactococcus lactis, Pedioccocus acidilacti, Pedioccocus pentosaceus, Pedioccocus urinae* and/or *Leuconostoc mesenteroides*.

Aspects of the current invention allow for replacement of original microorganisms found on the surface of a seed with a group of fast-growing mesophilic organisms that can out-compete and potentially kill residual target pathogens and spoilage organisms that have survived the sanitation process, and also allow for introducing a mixed cocktail of mesophilic and psychrotrophic beneficials either together or in sequence, to allow the psychrotrophs to grow and protect the product during refrigerated storage, with the mesophilic organisms having previously protected the product during the germination and growth phases.

In a preferred embodiment, each beneficial strain used will be characterized to ensure that it is void of virulence factors for humans, and is not antagonistic to other members of the cocktail or organisms to be placed in contact with the seeds or agar.

When seeds and sprouts are in contact with moisture, an opportunity is provided for pathogenic or other harmful organisms to take advantage of this moisture for purposes of survival and growth. According to this invention, beneficials are added to replace and out-compete the harmful flora and prevent harmful growth from happening.

Beneficials may be brought into contact with sprouts in various ways, according to the apparatus and methods which are being employed to germinate and grow the sprouts. For this invention, beneficials may be added after the seeds have been sanitized and their normal flora is destroyed. Beneficials may also be added to the agar solution.

In particular aspects of the current invention, beneficials may be added at any point in a sprouting process, from direct application to dry seeds to later application to the seeds as they rest upon the agar layer, or by admixture with the agar layer as it is poured into the container.

In a preferred embodiment of the invention, two groups of beneficials are added to the media, with one group selected for optimum growth at moderate temperatures (e.g., 15-27° C. (60-80° F.)), and the other selected from growth at colder temperatures (e.g., 0-7° C. (32 to 45° F.)). The first group, known in the art as "mesophiles" will grow best at the moderate, warm temperatures (e.g., 15-27° C. (60-80° F.)), which the seeds need to germinate and grow. The second group, known as "psycrophiles" or "psychrotrophs" grow best at colder temperatures (e.g., 0-7° C. (32 to 45° F.)), such as those at which the container of sprouts will be stored after the germination and growth phases have been completed.

For example, if the best temperature for seed germination is 29-30° C. (85° F.), then the beneficials selected will be those which prefer to grow at or near this temperature. Even more preferably, if it is planned that the sprouts will be allowed, say, three days for growth, and then be placed in refrigerated storage at, say, 7° C. (45° F.), then additional beneficials, selected for this temperature, may also be added to the media. The concept is that the first group of beneficials will protect the sprouts while they are germinating, while the second group will multiply and take over this role when the container is cooled to 7° C. (45° F.), having remained more or less dormant at the higher temperatures.

A distinguishing feature of this invention is that it promotes prompt shipping of sprout product from the manufacturing facility, as opposed to prior art systems wherein sprouts remain in the facility during their entire growth phase, typically in a rotating drum being continually irrigated with water. In contrast, with the present invention, sprouts may be shipped immediately after they are placed upon a layer of media within the container.

Multiple containers may be placed upon, for example, a pallet, and then the pallet placed onto, for example, a truck or rail car for shipping. The truck or rail car is set up to provide the palletized containers with heat or cooling to maintain optimum growth conditions for the sprouts during shipment. For example, if the sprout containers are placed in a rail car, a heat pump unit on the rail car may be programmed to provide the best temperature for sprout growth. For example, if the best temperature profile for a particular type of sprout is 21° C. (70° F.) for three days, with the sprouts then being placed into cold storage at 7-8° C. (45° F.), the rail car heat pump system would be programmed to provide this profile. Sprouts, for example, might be destined for delivery to consumers in Boston, Mass., a five day rail trip from where they are packaged, in, for example, Spokane, Wash. In this case, seeds would be placed into containers with media and beneficials on day 1. The containers would be sealed, placed in pallets, and loaded onto a rail car, where they would be kept at 21° C. (70° F.) for germination and growth on days 1, 2, and 3. On day 4, the sprouts will have completed their required growth, so, the rail car temperature would be reduced to storage mode temperature, which could be 7-8° C. (45° F.). On days 4 and 5, the sprout containers would proceed to Boston in the rail car at the cold storage temperature.

The foregoing is in contrast with the current art for delivering sprouts via rail or truck, in which sprouts must reach desired size in the manufacturing facility before being loaded for transportation. In such a system, the sprouts would not be growing during transit, but would merely be in storage, with the transportation time being subtractive directly off the shelf life of the product. The end result in the prior art is sprouts that are several days less fresh being delivered to Boston.

A distinguishing feature of particular methods of the present invention is that they allow shipment of sprouts with a variable temperature profile in the transportation vehicle, in which an initial growing phase temperature is followed by a storage phase temperature. The transportation vehicle, which might also be a temperature-controlled shipping container, or a rail-car or truck, is provided with a multiphase time-temperature profile, having a first phase with temperatures suitable for sprout growth, and a second phase with temperature suitable for sprout storage. The temperature profile may, for example, be implemented by an automatic control system involving a real-time clock and a temperature controller, or it may be implemented by manual setting of the vehicle temperature controls in accordance with instructions to the driver that are provided along with the sprout shipment.

This invention has various preferred aspects and/or advantages, including the following:

A. Growing in a retail ready package with no irrigation and no drainage holes. Particular aspects allow for initial input of the seeds and media into the ultimate retail package that will be delivered to the consumer, without the need for later input of water or nutrients by way of irrigation. This means that the container need not have holes for the input of irrigation water, or holes for the outlet of such water. The absence of these inputs and the holes they necessitate means that the container may remain sealed against contamination, thus providing a more sanitary and healthful product, secure against contamination by pathogens.

B. Growing on a media that holds water, such as agar, cellulose, seaweed, algae, alginin, other complex polysaccharides or proteins, or polymers. Agar is a suitable medium for the water-retaining layer upon which the seeds are placed. However, other water-retaining, food-safe matrix materials are suitable for use with this invention, and these materials may include, for example, various forms of agar, cellulose, seaweed, algae, alginin, other complex polysaccharides or hydrophilic proteins, or polymers, sponges, textile fibers, and other suitable materials that will be apparent, in view of the present disclosure, to one of ordinary skill in the art.

Figure 3:
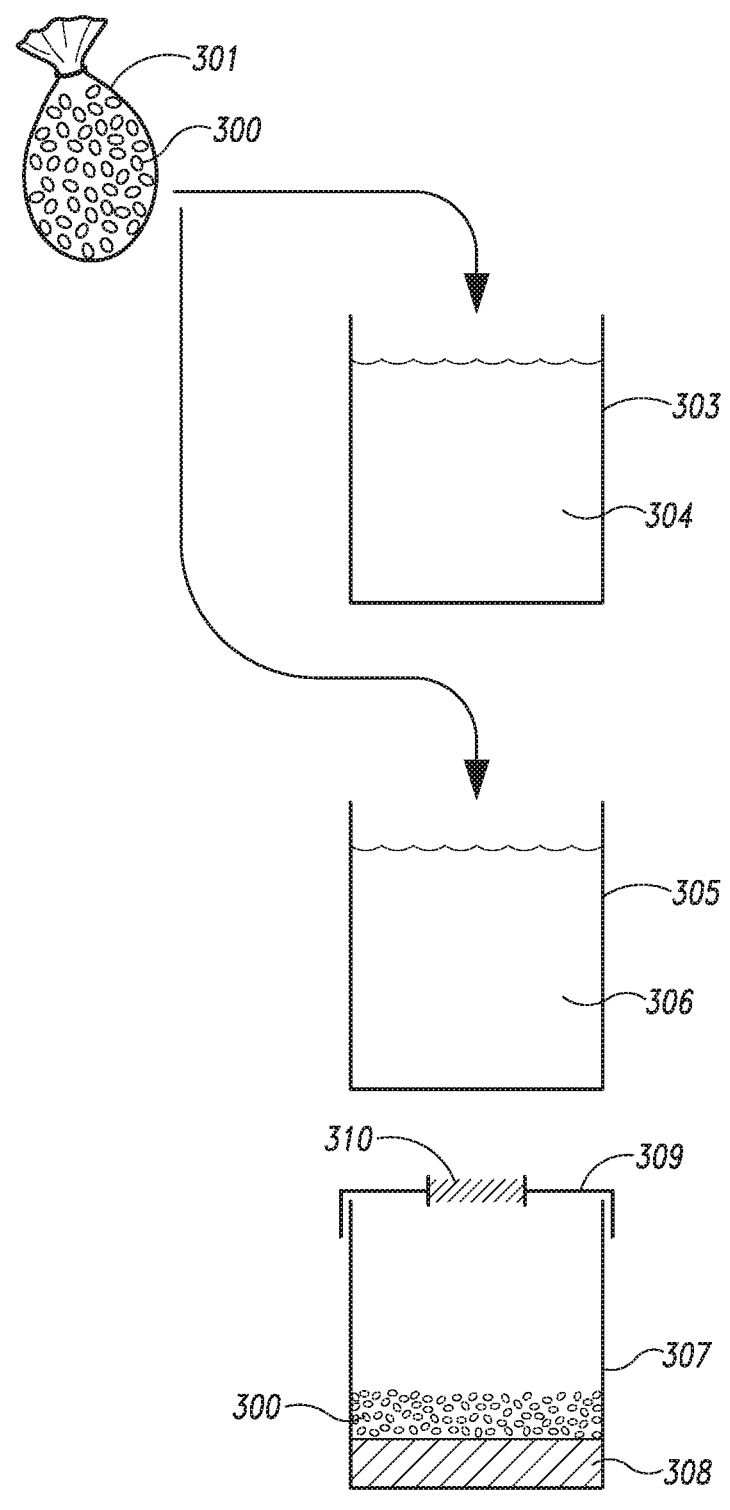
FIG. 3 is a detailed flowchart of the sprout production method production of FIG. 2, according to certain aspects of the present invention.

C. Growing container with micro-perforations or small holes that allow for exchange of gases and water vapor without allowing for contaminants to come in. The container in which the seeds and media are placed should resist the entry of microbial contaminants from the outside. This may be done in a mechanical manner with a lid held by means, for example, of gravitational force against the mouth of the container, in the manner of a petri dish cover. Other arrangements may involve containers with small holes and baffles which tend to block the entry of larger particles such as airborne bacteria, while permitting the exchange of water vapor, air and respiratory gasses with the outside. Some plastics, textile materials, and other materials permit gas and water vapor exchange while also blocking microbial contaminants. Medical gauze is an example of such a material that might be used to provide a contamination-resistant vapor exchange port in a container otherwise made of impervious material. Various synthetic sheet materials are suitable for providing gas exchange while preventing microbial contamination. An example of such material is 10 mil natural polyethylene film, as described in Kordan, Applied Microbiology, Vol. 13, No. 5 (1965). Other suitable films might be those plastics used in blood banking operations that permit exchange of cellular gases, while preventing passage of liquids and, of course, microorganisms. A discussion of suitable plastic materials is given in Christopher, Blood Banking and Transftsion Medicine, pp. 183-187, (Elsevier Health Sciences, 2007). FIG. 3 shows a patch of gas exchange material 310 incorporated into a container lid.

D. Seeding and growing with partial or complete growth in transit. An important advantage of particular aspects of the invention is provision of the opportunity for the sprouts to grow while in transit (e.g., without pathogen growth). After the media and seeds are placed into the container, the container is sealed and needs no further inputs of water or other materials. This means that the seeds may leave the manufacturing facility immediately and commence to grow while in transit, aboard a truck, railcar, or in a shipping container. Preferably, these modes of conveyance will provide temperature control tailored to the needs of the growing sprouts (i.e., warm temperatures (e.g., 15-27° C. (60-80° F.)) for the first few days in which growth is commenced and then completed, and colder temperatures (e.g., 0-7° C. (32 to 45° F.)) thereafter, to prolong shelf life). This is a significant advance solving a major problem in the art of sprout growing because it eliminates the need for extensive plant floor space for sprout-growing, rotary bins or other machines, and, it also permits sprouts to be several days nearer to their ultimate destinations at the time when growth is completed and the clock starts to run on shelf life, and further permits a much higher level of safety with respect to potential pathogens and spoilage organisms. With current technology, sprouts begin to age and burn shelf-life immediately upon packaging at the factory. However, with the current invention, sprouts may spend most or all of their transit time in the growth phase, and thus not enter the shelf-life use and decay phase until days later, providing major safety and financial/commercial advantages.

E. Shipping in containers that hold the growth temperature and shift to cooling after desired growth is achieved. An important element of particular aspects of the invention is the use that is made of temperature-controlled shipping means, such as refrigerated/heated shipping containers, railcars, trucks, and the like. To take best advantage of this invention, filled sprout containers should be provided with transportation or shelf-display at temperatures which best promote the initial growth of the sprouts, and then lower temperatures that best promote storage, after optimum growth has been achieved. Thus, particular aspects of the invention afford and/or comprise the use of transportation modes which provide temperature control suitable for spout growth in the initial hours and days until the sprouts reach maturity, and then, preferably, which provide a switch to temperature control that is best suited to lengthening shelf-life, as in cold storage. A computer controlled thermostat attached to a cooling/heating unit on a shipping container is an example of such a mode, particularly if the computer control also embodies a real-time clock than can change the temperature when the sprouts have had enough time to grow, and thus need to be maintained at a different, usually lower, temperature for storage purposes. In cases where the transportation distance is not large, it may be that the sprouts may not have finished growth prior to the time they reach the store where they are to be sold. In this case, the store itself may be provided with a temperature controlled display case, preferably programmed to switch over from growth-phase temperature to storage-phase temperatures at the appropriate time. It is also preferable that each shipment of sprouts leaving the factory be provided with remotely-readable data logging means that can be read by receiving store display cases by means of a wireless data link, or the like, so that the receiving store case may calculate the correct time to switch temperature from the optimum growth phase temperature to the storage phase temperature.

F. A method of delivery of beneficial microbes, where the microflora of the seeds is destroyed through sanitation and replaced by the beneficial organisms. An important element of particular aspects of the invention is the opportunity it affords for the use of probiotic organisms to protect sprouts from contamination during their growth and shipping phases. Prior art methods which involve irrigation prevent a lasting contact to be made between probiotic organisms and the sprouts, because the sprayed-on irrigation water inherently washes off any beneficials that may have been previously applied. With this invention, however, the beneficials may be incorporated into the media layer from the beginning or mixed in with the seeds that are applied to the media layer. Since the container is then sealed, there is no incoming irrigation or spray water to wash away the beneficials. Moreover, the media may be provided with nutrients suited to the growth of the probiotic organisms. It is preferable that the seeds, container, and media be subjected to sanitation before use so that harmful microorganisms are eliminated or reduced. Then, a heavy dose (e.g., a dose sufficient for effective competition/antagonism purposes relative to possible pathogens) of beneficial organisms is added to the container, so these are given a good start on growth without the need to compete with bad organisms.

G. A method for delivery of beneficial microbes. As discussed herein, beneficial microbes may be or include microbes that are antagonistic to pathogens and spoilage organisms; microbes that are considered to be beneficials for humans; and microbes that produce vitamins and cofactors such as vitamin B12, antioxidants, anti-carcinogens, anti-teratogens, immunostimulants, and beneficial oils. These microbes may include mesophilic microbes added at an early stage in the method to sanitized seeds and early-stage sprouts to allow for competition against pathogens and spoilage organisms. A second group of psychrotrophic or psychrophilic beneficial microbes may be simultaneously added, or are added at the end of the growth cycle. The members of this second group grow at lower temperatures and thus offer protection to the product at low temperatures which are used to extend shelf-life of the product, subsequent to the sprouts reaching marketable size. An important aspect of particular aspects of the invention is the concept of two-phase growth of the product: A first phase for germination and development of the sprouts to marketable size, which is accomplished, generally at warm temperatures conducive to plant growth, and, a second phase, in which the sprouts are subjected to different, usually colder, temperature, so that the shelf-life of the mature product may be improved. This two-temperature-phase aspect is not only important for transportation arrangements, as described above, but it is also important from the standpoint of selecting the best probiotic organisms. Various probiotic organisms may have different temperature preferences for their own multiplication and growth. Some organisms are "mesophiles" which like warmer temperatures, such as room temperature, or perhaps higher, such as 4-5° C. to 7-8° C. (40 to 45° F.). These organisms are best suited to protect the sprout product during the germination and growth and phase, when the sprouts also develop best with warm temperatures. However, when the sprouts reach market size, and need to go into the storage, colder environment to preserve shelf life, then the mesophilic beneficials may not remain effective. At this point, cold-loving, psychrophilic probiotic organisms are needed. These organisms can be provided by including them in the initial input of beneficials into the media of this invention. These organisms will remain dormant during the initial warm-phase of the product, but, when storage-phase temperatures are imposed, they will come to life and multiply, to provide probiotic protection and benefits during storage as well. Preferred aspects provide a mixture of probiotic organisms, containing both mesophilic/warm-loving organisms and psychrophilic/cold-loving organisms in the initial input of beneficials.

H. Another beneficial aspect of this invention is the ability to impose safety and quality testing at various stages of the method. In certain aspects, the invention comprises sprout and micro-green production in which the safety of the product is assessed with one or more of the following steps:

a. Each batch of seed is subjected to statistically significant sampling and testing for multiple pathogens including *Salmonella, Listeria*, and EHEC;

b. After 1-2 days of germination, germinated sprouts are subjected to secondary testing for the same organisms;

c. A finished product testing program, employing a statistically significant sampling plan is employed to test the finished product before release into the market; and d. A method of conducting finished product sampling where retail-ready containers are seeded, samples are taken and placed in a larger container with the media that will be subjected to growth at the same or preferably higher temperature to expedite growth and then tested before the release of the lot.

I. Addition of Microbe-Growth-Promoting Nutrients to the Agar to promote growth of the probiotic organisms. To encourage growth of the probiotic organisms in the media layer of embodiments of the invention, nutrients that enhance the growth of probiotic organisms may be added, such as those found in DIFCO™ MRS media, the formula for which is as follows:

| DIFCO ™ Lactobacilli Agar AOAC Approximate Formula* Per Liter | |
|---|---|
| Peptonized Milk | 15.0 g |
| Yeast Extract | 5.0 g |
| Dextrose | 10.0 g |
| Tomato Juice (from 100 mL) | 5.0 g |
| Monopotassium Phosphate | 2.0 g |
| Polysorbate 80 | 10 g |
| Agar | 10.0 g |

Applicant has also been found that adding a source of nitrogen and minerals can promote growth. For example, enhanced growth was observed when a sheet of dried kelp was added beneath the agar layer.

To provide an adequate number of sprouts in a retail package, it is preferable to place sufficient sprouts upon the agar layer in the container such that at least a portion of that layer is covered with a double layer of sprouts. It is more preferable that said layer be totally covered with two layers of sprouts, and, in some cases three layers of sprouts. To provide a source of oxygen for sprout development, it has been found beneficial to add to the water absorbent layer a microorganism that produces hydrogen peroxide.

In the following claims, the term "sprouts" includes sprouts, shoots, and microgreens. Microgreens are defined in the food trade as greens, lettuces and herbs which are harvested when quite young, generally when they are approximately an inch tall. The term sprout also includes newly-germinated seeds and also small plants which are created from methods of tissue culture or asexual production which do not involve seed. In particular embodiments of the invention, sprouts also comprise soaked seeds used for sprout generation, which soaked seeds are placed on the water-absorbent layer in the methods of the invention.

Example 1

A No. 1305 100 mL PYREX Glass Container was Prepared with about 10 ml of 0.5% Agar Solution A No. 1305 100 mL PYREX glass container was prepared with about 10 ml of 0.5% (wt %) agar solution. This concentration was chosen as optimum after some experimentation, as it was found that 0.7% (wt %) solution, normal for bacteriological use, was too rigid for easy root penetration and sprout embedding, whereas a 0.4% (wt %) solution provided a gel which was too soft, such that some of the larger seeds or sprouts sunk to the bottom of the agar layer. The preferable consistency for the layer is to be as soft as possible yet still rigid enough to support the seeds on the top of the layer (e.g., between 0.4% (wt %) and 0.7% (wt %), preferably between 0.45% (wt %) and 0.6% (wt %), or 0.45% (wt %) and 0.55% (wt %)). A stock 0.5% (wt %) agar solution was prepared with 0.5 g of agar power in 100 ml of water. Rather than agar, other water-holding materials may be substituted, for example, alginate, complex natural polysaccharides, cotton fiber, wood fiber, paper, protein gels, and the like. Any substance which can hold water adequate for growth of the seeds is a candidate, provided it is not easily biodegradable or metabolized by the microbial flora of the seeds or the introduced beneficial microbial flora. Agar is a preferred substance because it is food grade and is a natural product of seaweed. Agar is also preferable because it becomes essentially invisible as the contained water is absorbed into the sprouts, such that after a few days of growth, layer 102 (see FIG. 1) virtually disappears and only a mass of roots is seen in its place.

Example 2

Figure 2:
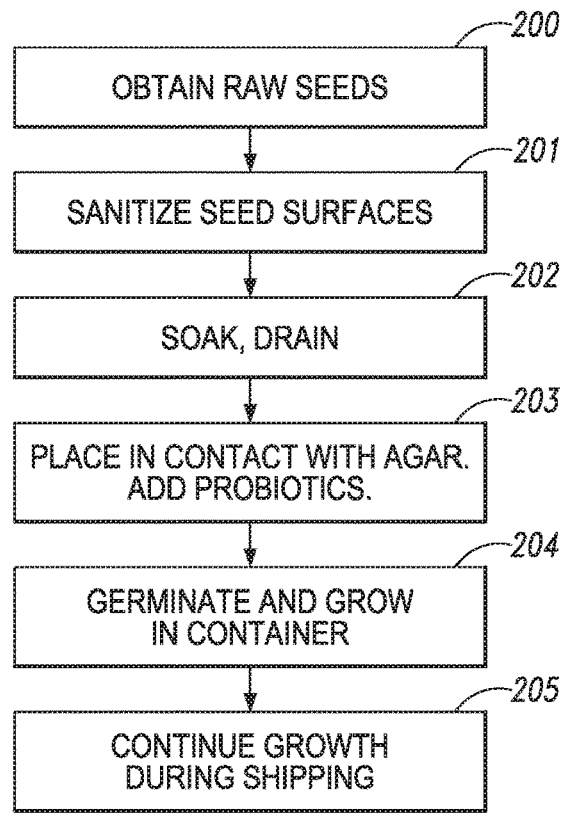
FIG. 2 is a flowchart of a sprout production method production according to certain aspects of the present invention.

Sprout Seeds are Sterilized, Rinsed, Soaked, Placed on Media Layer in Container Sealed with Cap Permitting Gas Exchange, and Providing for Growth in Container, Even During Shipment and During Display on Store Shelves FIG. 2 merely illustrates one embodiment of the invention, which could be implemented with various seeds, washing methods, containers, and probiotic additions. FIG. 3 depicts another embodiment of the inventive methods for growing sprouts of FIG. 2. Sprout seeds 300 are placed into bag 301 and dipped into container 303 containing a bleach solution 304. The bleach solution residue is removed from the seeds by rinsing the bag with water. Then the seeds are placed into soaking solution 306 contained in container 305, which optionally contains beneficials. After a suitable period of soaking, which typically may be from six to forty-eight hours, the seeds are either close to germination or have already germinated. At this point, the seeds 300 are placed into sterile container 307 upon media layer 308 at the bottom of the container, and the container is sealed with cap 309. The cap may be held in place by gravity, providing a physical barrier against microbial infiltration, while also permitting gas exchange, in the same manner as a petri dish cover. Optionally, the container cap could be sealed tightly, but be provided with permeable membrane portion or patch 310, which is a patch of gas permeable plastic or other suitable material, which permits gas exchange to occur while not affording passage to objects the size of bacterial cells (e.g., 1 to 2 microns). According to particular aspects, a gortex-type material (polytetrafluoroethylene, the chemical constituent of Teflon™, with a micro-structure characterized by nodes interconnected by fibrils) may be used.

A great advantage of this approach is that sprouts are allowed to grow in container 307, even during shipment 205 and during display on store shelves. This means that shipment from the manufacturing facility may take place as soon as sprouts are placed in the container, without the need for several days of additional growth, which in the prior art, would occur in drums or like apparatus at the manufacturing facility. This greatly reduces requirements for facility floor space, and it also means that sprouts will be available for consumption immediately after completing growth during the shipping phase. The results in added product shelf-life and fresher, safer sprouts available for the consumer.

It should be noted that the seeds and sprouts of this invention preferably form a dense growth of plants upon the surface of the media, the roots of which eventually absorb the water from media layer 308, causing that layer to shrink or disappear. At this point, the volume of container 307 consists almost completely of sprouts.

Agar-like materials or other water-holding materials could be substituted for agar in the practice of the methods of the invention. The role of agar (or the other suitable material) is to hold moisture in a confined format and provide a structural support upon which the sprouts may rest. Substances such as animal protein gelatin, which also holds water in a structural matrix, could also be used. One might also use a layer of sponge or textile or other water-absorbent material to provide support and water to the seeds. This is less preferable since the consumer would need to remove the bottom layer and discard it upon opening the product for use.

What is claimed is:

1. A method for growing sprouts during shipping, comprising the steps of:
    placing, prior to shipping, seeds or germinated seeds in contact with a water-supplying material layer in a sanitary, closed, retail-ready container, such that the water supplying material layer is covered by more than one layer of the seeds or germinated seeds so that the seeds in the upper layer of the seeds or germinated seeds are not in direct contact with the water-supplying material layer; and
    shipping the container, wherein during shipment the container is configured to provide for exchange of gases and water vapor while precluding entry of contaminants, wherein the water-supplying material layer provides sufficient water to provide for growth of the sprouts to marketable bulk or size without the need for additional water input or opening the container, and wherein the seeds or germinated seeds, prior to placing in contact with the layer of water-supplying material, are derived from hydrated seeds with internal moisture sufficient to support germination of the seeds in the upper layer of the seeds or geminated seeds that are not in direct contact with the water-supplying material layer, and prevent dry out of the top of the water-supplying material layer in direct proximate contact with the seeds or germinating seeds.

2. The method of claim 1, wherein said water supplying material layer comprises one or more selected from the group consisting of agar, agar-agar, seaweed, algae, algal extracts, alginate, cellulose, chitin, pectin, complex natural polysaccharides, sponges, water absorbing polymers fiber, paper, and protein gels.

3. The method of claim 2, wherein the water-supplying material layer comprises agar, agar-agar, or water.

4. The method of claim 1, wherein the water-supplying material is divided into pieces so as to afford better contact with the sprouts, seeds, or germinated seeds.

5. The method of claim 1, wherein the water-supplying material supplies sufficient water to grow the sprouts to marketable size, without the need for additional water input, to provide for avoiding microbial contamination.

6. The method of claim 1, wherein the water-supplying material layer supplies sufficient water to provide for growth of the sprouts without the need for additional water input during shipment or prior to sale.

7. The method of claim 1, wherein the seeds or germinated seeds, prior to placement, are soaked to absorb at least about 40% of their dry weight in water during the soaking process.

8. The method of claim 7, wherein the seeds or germinated seeds, prior to placement, are soaked to absorb at least about 80% of their dry weight in water during the soaking process.

9. The method of claim 1, wherein the sprouts, seeds, or germinated seeds, prior to placement, are derived from seeds soaked in the presence of a beneficial microbial organism.

10. The method of claim 1, wherein the container is sealed against the introduction of liquid water.

11. The method of claim 1, wherein the container is a retail-ready container sealed against the introduction of liquid water and microbial contaminants.

12. The method of claim 1, comprising the additional step, after achieving adequate growth, of maintaining the container at a different temperature appropriate for sprout storage, wherein the storage temperature is different than the sprout growth temperature.

13. The method of claim 1, wherein growth of the sprouts to marketable bulk or size comprises growth at a temperature in the range of 40° F. to 45° F.

14. The method of claim 1, wherein the water-supplying material layer comprises at least one additive selected from the group consisting of: beneficial microorganisms, probiotic microorganisms, vitamins, vitamin B12, cofactors, nutrients, phytochemicals, natural colors, antioxidants, plant nutrients, and human nutrients.

15. The method of claim 14, wherein the selected additive comprises a microorganism capable of producing hydrogen peroxide.

16. The method of claim 14, wherein the beneficial microorganism is at least one selected from the group consisting of mesophilic microbes, and psychrotrophic or psychrophilic microbes.

17. The method of claim 16, wherein the added beneficial microorganisms comprise both mesophilic microbes and psychrotrophic or psychrophilic microbes.

18. The method of claim 17, wherein the seeds and/or germinated seeds are sanitized, wherein the mesophilic microbe is added at an early stage in the method to the sanitized seeds and/or the germinated seeds, and wherein the psychrotrophic or psychrophilic microbe is added at a later stage, in each case in sufficient amounts to allow for competition against pathogens and spoilage organisms at the respective stages.

19. The method of claim 1, further comprising growing the sprouts to a marketable bulk or size.

20. The method of claim 1, further comprising shipping the container under temperature conditions such that the sprouts continue to grow during shipping.

21. The method of claim 1, wherein the seeds or germinated seeds are hydrated and inoculated with beneficial organisms and/or probiotics, and refrigerated until being placed in contact with the water-containing material.

22. The method of claim 1, wherein, after placing the seeds or germinated seeds in contact with the layer of water-supplying material in the container, the container is packed and shipped, and growth to marketable bulk or size is achieved in transit.

23. The method of claim 13, wherein growth of the sprouts to marketable bulk or size comprises growth at 40° F.

24. The method of claim 12, wherein the different temperature appropriate for sprout storage is lower than the sprout growth temperature.

* * * * *